Sept. 5, 1967 N. V. LONG ETAL 3,340,537
TEXTILE PRODUCTION CONTROL APPARATUS
Filed Dec. 23, 1965 9 Sheets-Sheet 1

INVENTORS
NOEL V. LONG
DANIEL J. BUCKLEY
BY
ATTORNEY

INVENTOR.
NOEL V. LONG
DANIEL J. BUCKLEY
ATTORNEY

INVENTOR
NOEL V. LONG
DANIEL J. BUCKLEY
BY
ATTORNEY

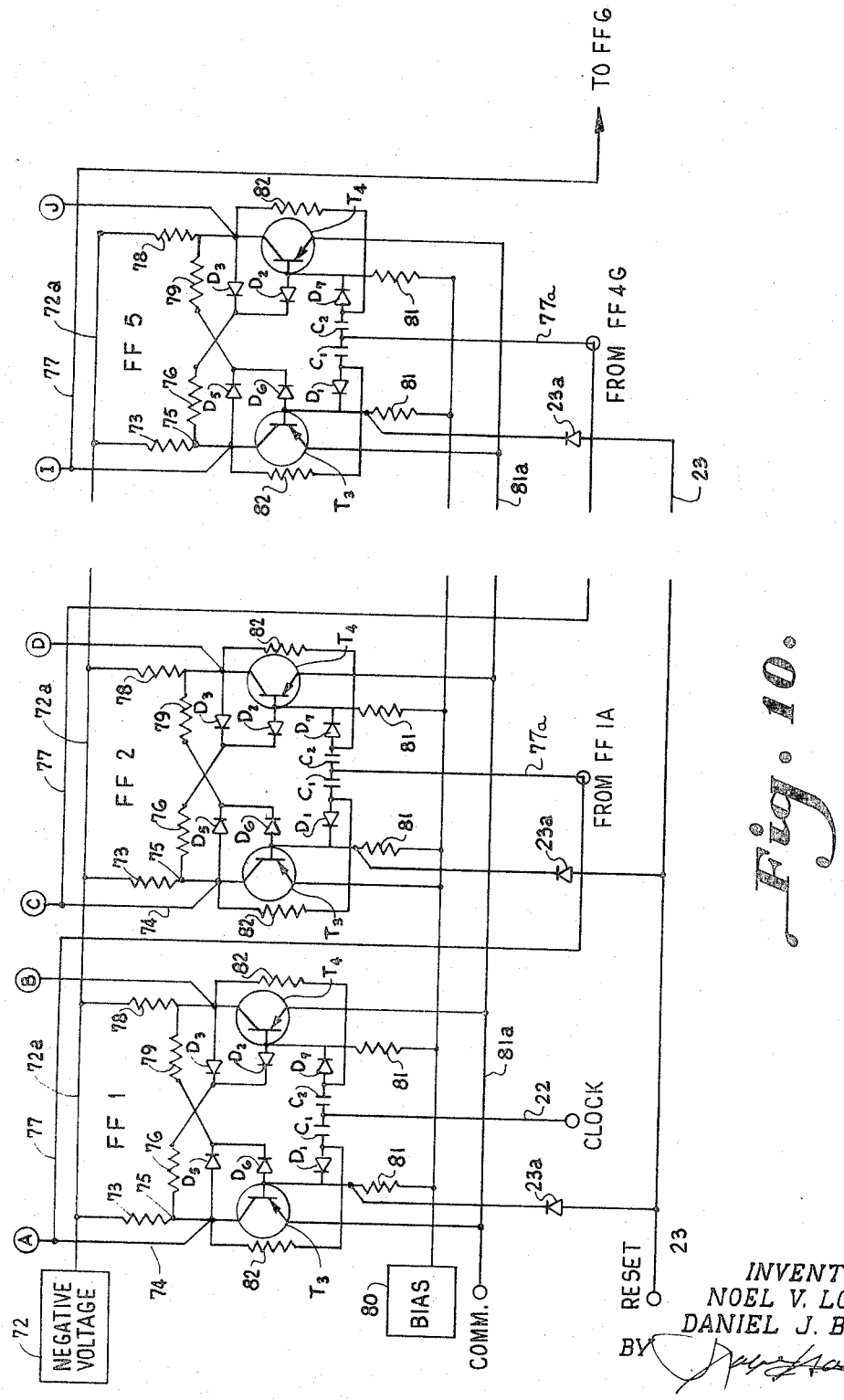
Fig. 10.
INVENTOR
NOEL V. LONG
DANIEL J. BUCKLEY
BY 
ATTORNEY Sept. 5, 1967          N. V. LONG ETAL          3,340,537
TEXTILE PRODUCTION CONTROL APPARATUS
Filed Dec. 23, 1965                    9 Sheets-Sheet 9

INVENTOR
NOEL V. LONG
DANIEL J. BUCKLEY
BY
ATTORNEY

United States Patent Office 3,340,537
Patented Sept. 5, 1967

3,340,537
TEXTILE PRODUCTION CONTROL APPARATUS
Noel V. Long, Greenville, and Daniel J. Buckley, Travelers Rest, S.C., assignors to Adams Incorporated, Greenville, S.C., a corporation of South Carolina
Filed Dec. 23, 1965, Ser. No. 515,878
8 Claims. (Cl. 346—34)

ABSTRACT OF THE DISCLOSURE

The specification discloses a production control apparatus for monitoring the operation of a large group of machines. Each of the machines has a signal generator coupled thereto for feeding a signal to a corresponding gating device. Other signals are supplied to the gating devices in sequence so as to sequentially activate the gating devices permitting the signals coming from the signal generators coupled to the machines to pass therethrough. The signals from the output of the gating devices are in turn supplied to counters and a recorder for recording the operating condition of the machines.

Figure 1:
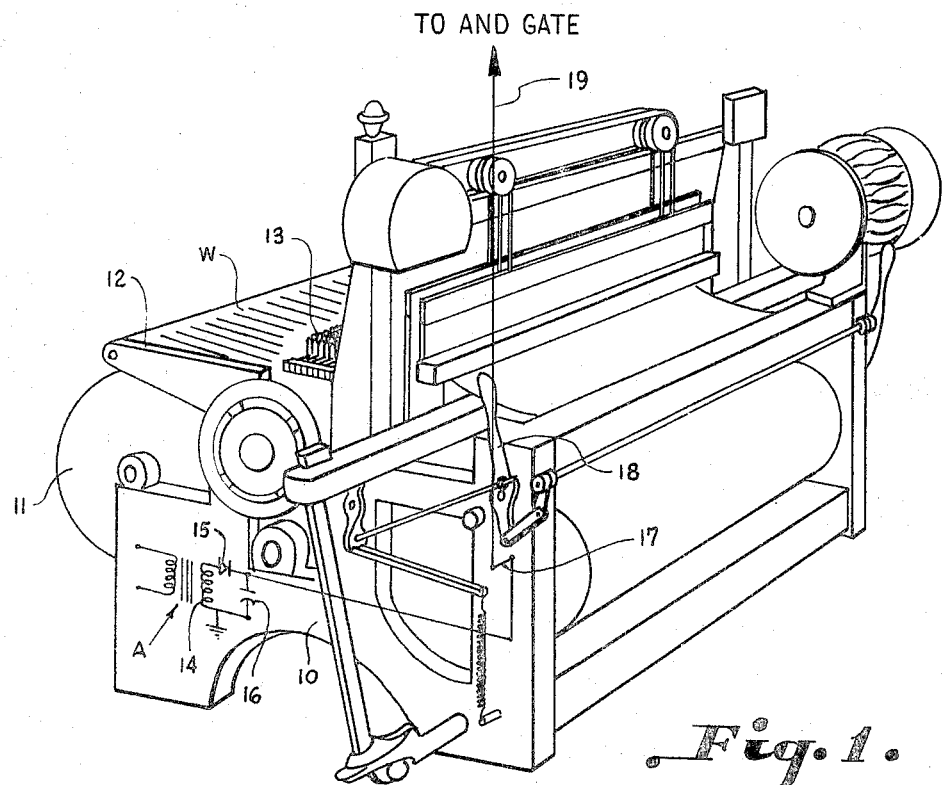

This invention relates to textiles and more especially to production control apparatus for recording the duration and time of occurrence of stops of each of a multitude of textile machines such as looms, knitting machines, spinning frames and the like, as well as apparatus for recording the total down time of large groups of textile machines.

Devices have been proposed for recording the total operating time of a group of looms for providing a basis on which to compute the wages of operators, however, such devices have either proved unreliable or too expensive to justify their use. Devices commonly used in the textile industry for the purpose of computing wages are individual pick counters, one of which is mounted on each loom. The only information provided by such counters is a measure of cloth production in terms of loom running cycles from the time of last reading. Such devices must be read periodically and the readings totalized according to groups of looms all of which is consuming of time and labor. Other devices have been proposed for computing loom down time due to specific causes such as, down time due to warp breakage or down time due to filling breakage. Such former devices have proved impractical due, to some extent, to the excessive complexity of the switch gear and the difficulty of making proper electrical connections from the large number of looms operated in a single weave room to a central reading station.

In my copending application Ser. No. 498,689, filed Oct. 20, 1965, and assigned to Adams, Inc., which is a modification of application Ser. No. 428,009, filed Jan. 8, 1965, now Patent No. 3,226,726, granted Dec. 28, 1965 and also assigned to Adams, Inc., an apparatus for recording individual machine down time, as well as selected groups of machines down time is disclosed. Application Ser. No. 428,009 has been passed to issue and will become a patent in due time. An earlier attempt to solve the above problems is illustrated in Patent No. 2,207,716 to Bumstead, granted July 16, 1940.

The subject invention contemplates a different apparatus for solving the above problems.

Accordingly, it is an important object of the invention to provide apparatus for recording individual machine down time with respect to duration and time of occurrence.

Another object of this invention is to provide a graph recording of such individual loom down time so that the operation of looms in one or more departments may be observed on a single graph.

Another important object of the invention is to provide operating condition information in numerical form grouped according to operator, shift and the like, so that a comparison of operator efficiency may be had.

Still another object of the invention is to provide effective apparatus for totalizing down time for groups of looms.

Another important object of the invention is to provide apparatus for monitoring a single down time signal and distributing this signal to one or more selected recording means according to a desired variety of groupings.

Another object of the invention is to provide simple effective apparatus for connecting a large number of looms, such as in a weave room, to recording apparatus for giving a variety of information on the operation of such looms.

An important object of the invention is to provide scanning means distributing loom stop signals to operate a graphic recording device and redistributing these same signals to one or more recording means each representing a group according to operator, style or shift as desired.

Another important object of the invention is to provide a permanent visual history of the activities of operators with relation to time and individual looms.

Still another important object of the present invention is to provide an apparatus including an electronic scanning device which will sequentially scan a plurality of machines and generate a signal indicative of a given operation of a machine.

Another important object of the present invention is to provide an apparatus for synchronizing the rotation of a recording drum with an electronic scanning device so that signals generated by said scanning device responsive to a given operating condition of a machine can be recorded on the drum at a particular location which identifies the machine.

Another object of the subject invention is to provide a gate circuit for receiving a plurality of input signals of low voltage and producing an output signal corresponding to said input signals when all of said input signals are proper.

Still another important object of the present invention is to provide an automatic monitoring system for a plurality of machines that presents the operating condition from each machine immediately and repeatedly on a permanent record form.

Another important object of this invention is to increase the reliability of a recording apparatus for giving a variety of information on the operation of a multitude of textile machines by reducing the number of components in said recording apparatus.

The construction designed to carry out the invention will be hereinafter described, together with other features thereof.

Figure 2:
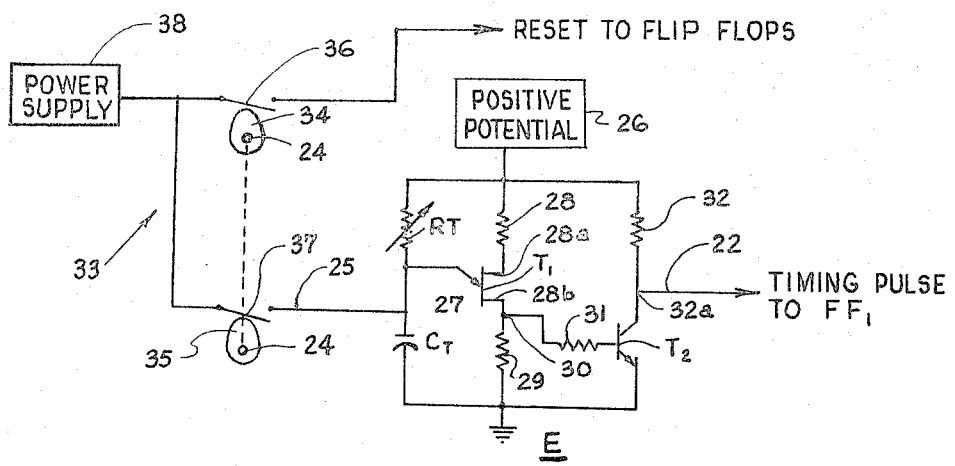
Figure 3:
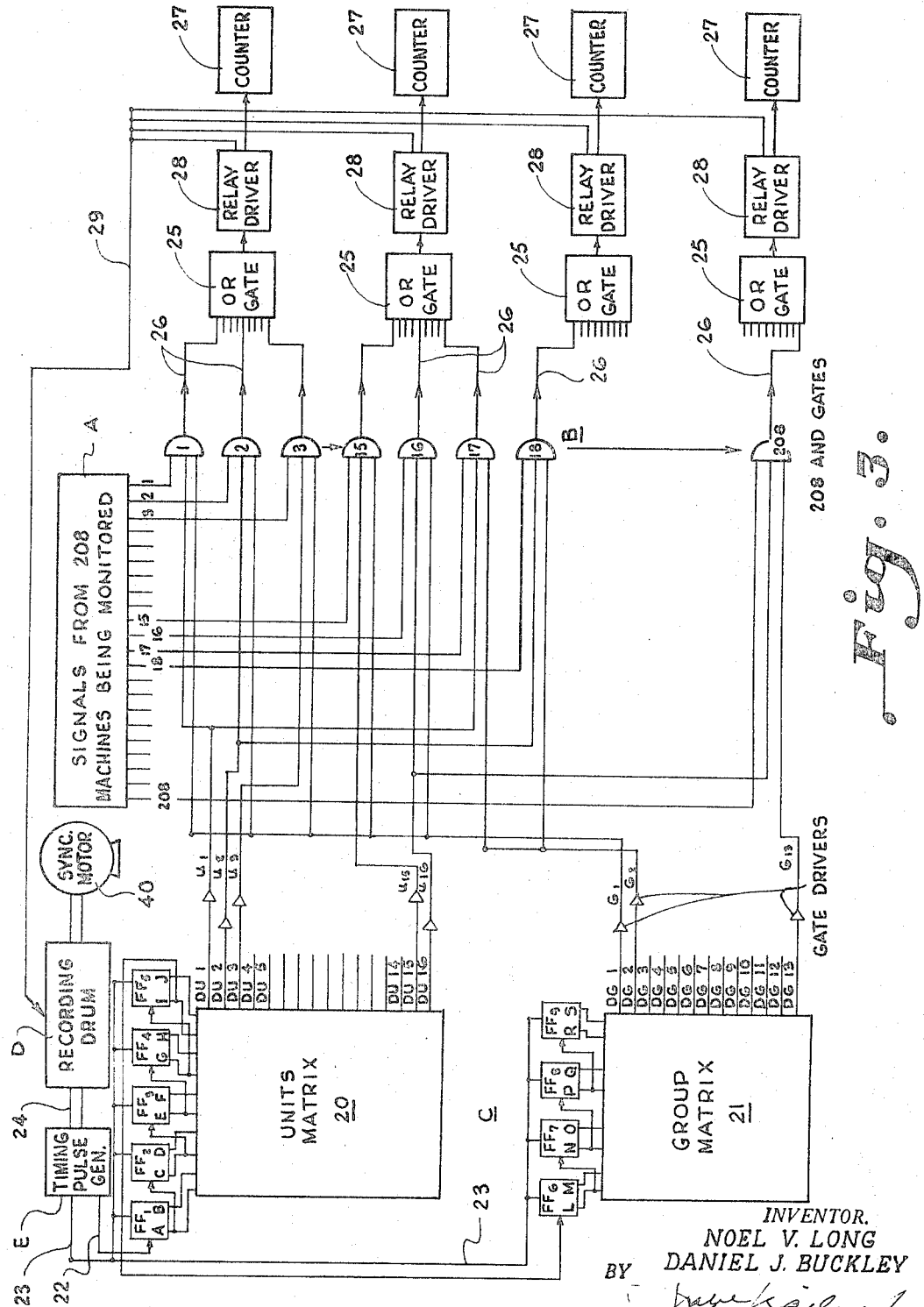
Figure 4:
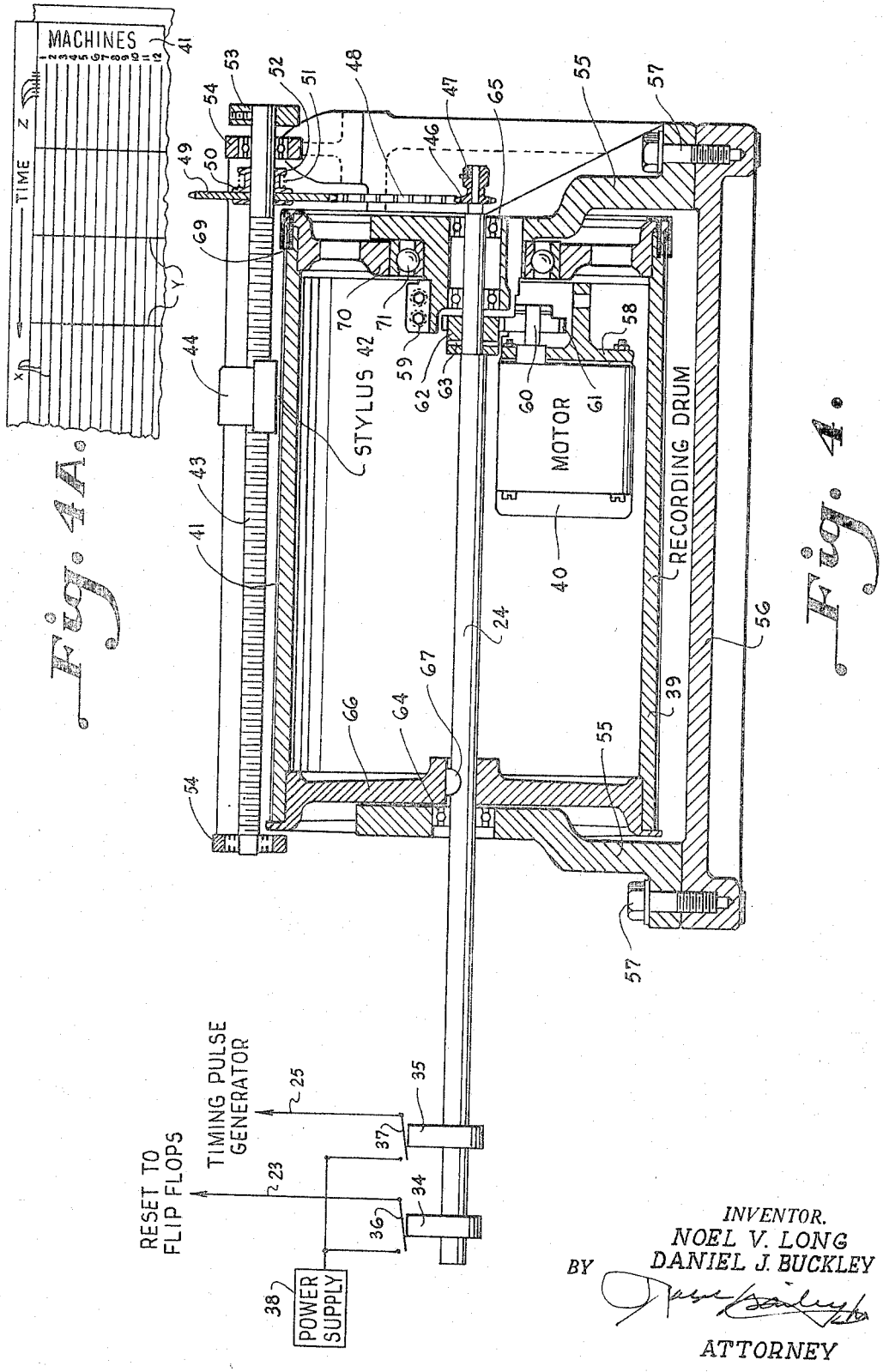
Figures 5, 6:
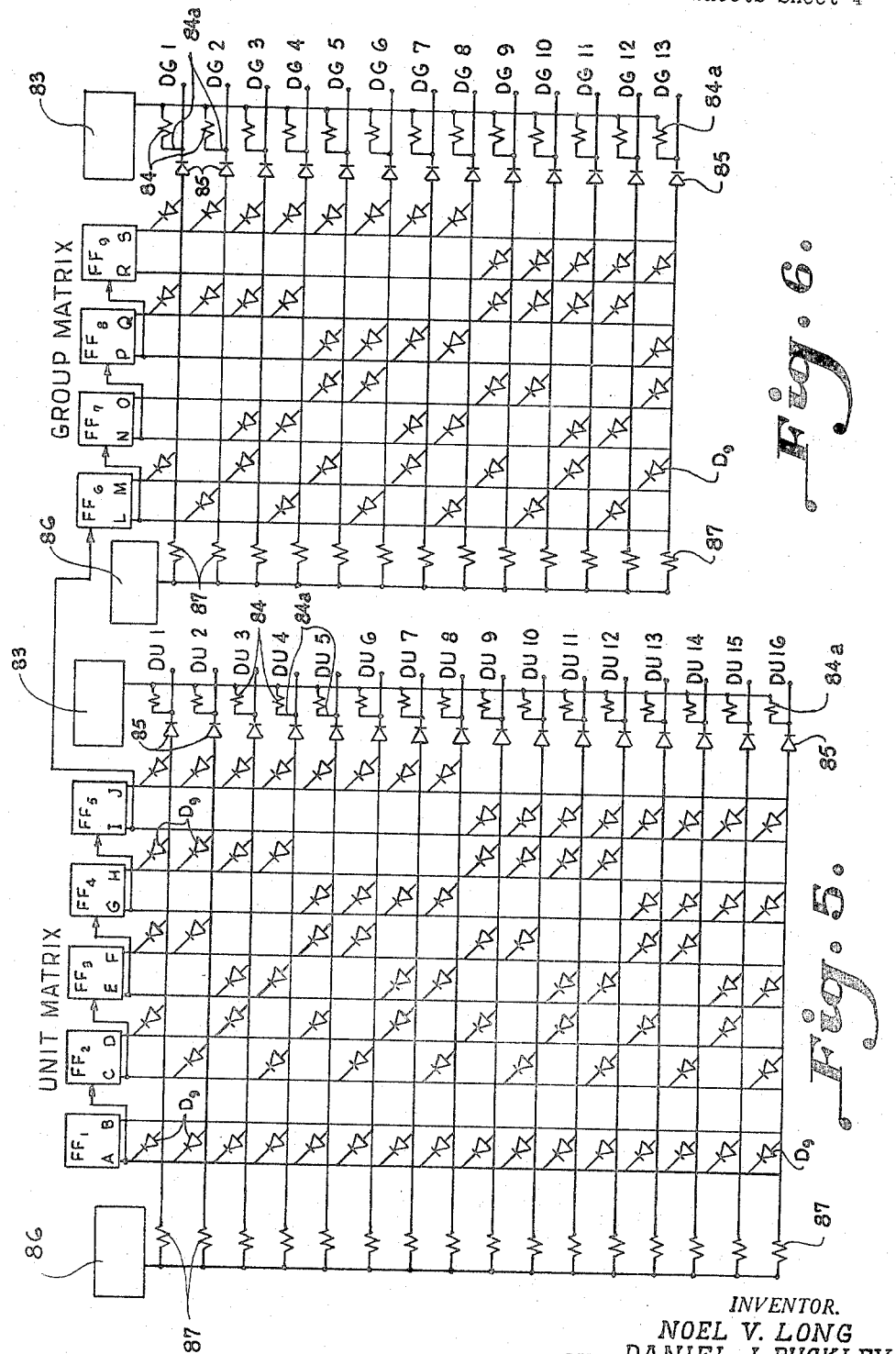
Figure 7:
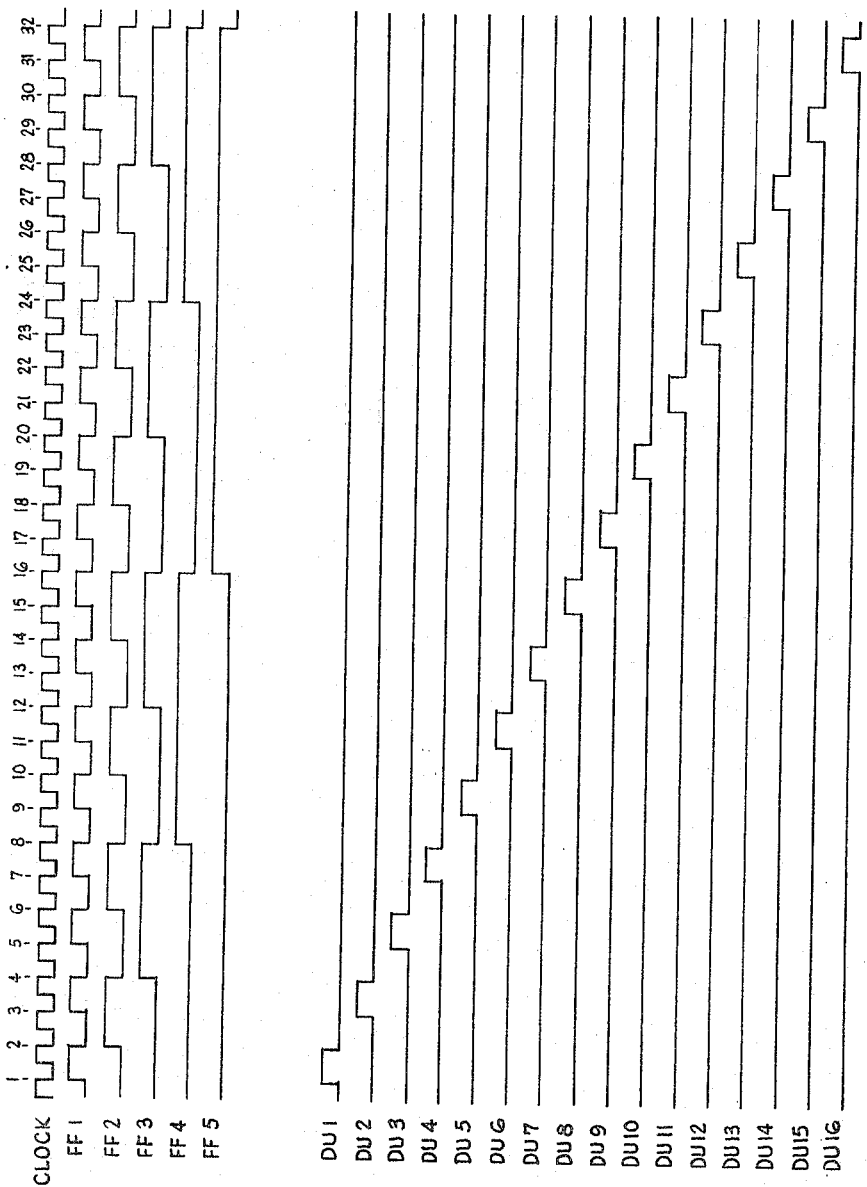
Figure 8:
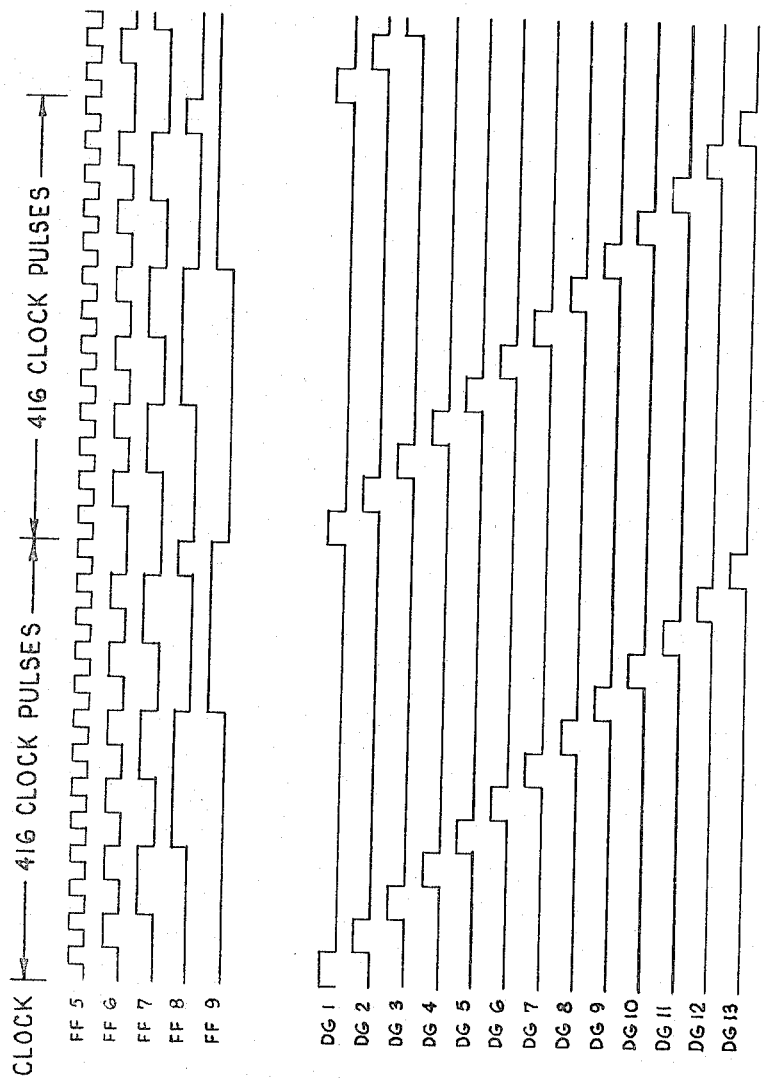
Figure 9:
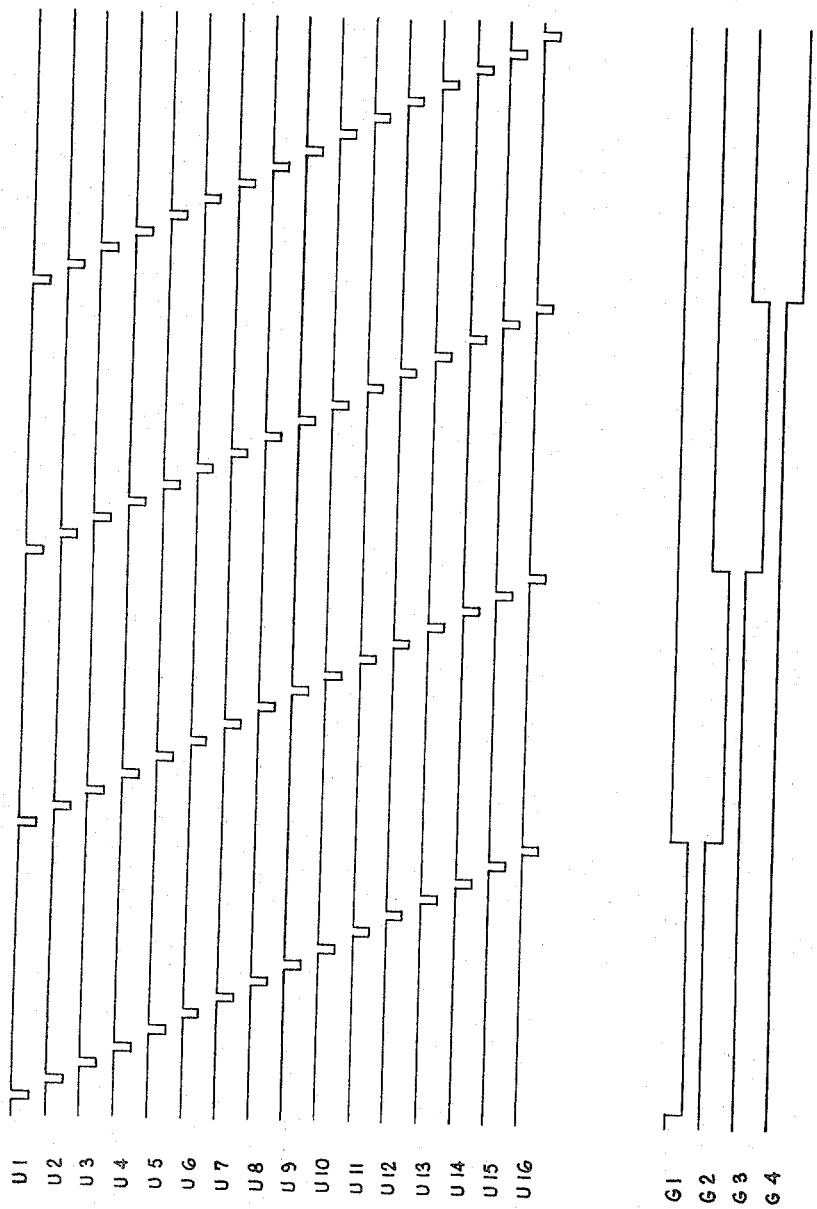
Figure 11:
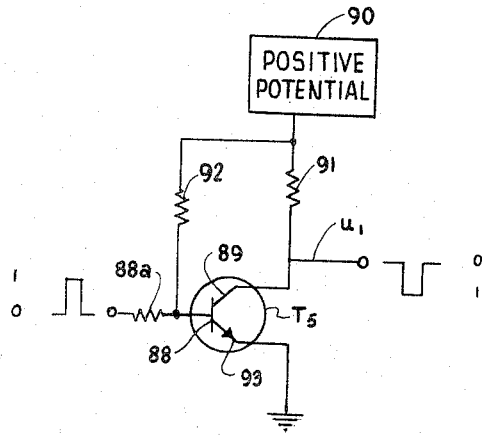
Figure 12:
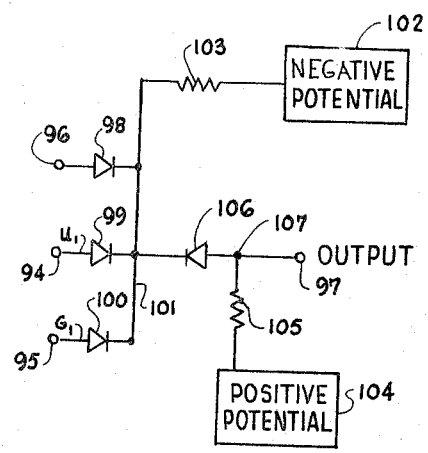
Figure 13:
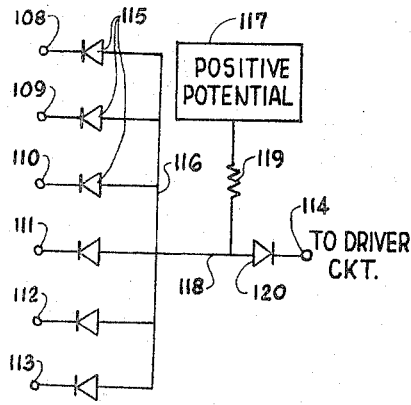
Figure 14:
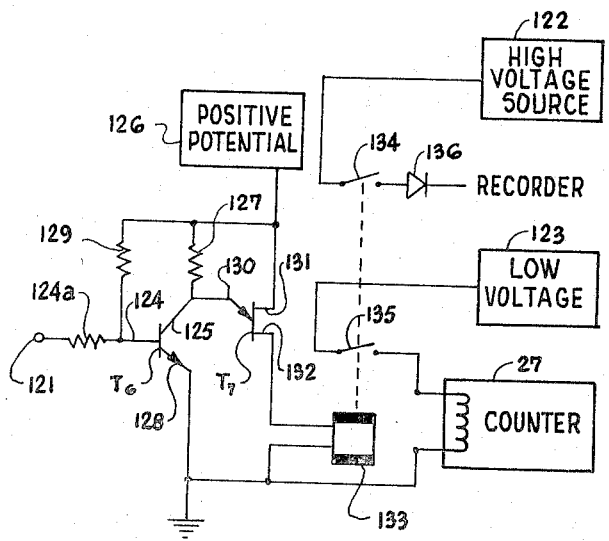

The invention will be more readily understood from a reading of the following specification and by reference to the accompanying drawings forming a part thereof, wherein an example of the invention is shown and wherein:

FIGURE 1 is a schematic perspective view illustrating a loom and the various electrical connections therefor according to the present invention, FIGURE 2 is a schematic circuit diagram illustrating a timing pulse generator utilized in a production control apparatus constructed in accordance with the present invention, FIGURE 3 is a schematic circuit diagram illustrating an apparatus constructed in accordance with the present invention, FIGURE 4 is a sectional side elevation of a recorder and timing mechanism constructed in accordance with the invention, FIGURE 4a is a front elevation illustrating a graph paper suitable for use on the recording drum illustrated in FIGURE 4, FIGURE 5 is a schematic diagram of a unit matrix used in one embodiment of the invention, FIGURE 6 is a schematic diagram of a group matrix used in one embodiment of the invention, FIGURE 7 is a pulse diagram illustrating the output signals from the unit matrix and the driving flip-flops associated with the matrix, FIGURE 8 is a pulse diagram illustrating the output signals from the group matrix and the driving flip-flops associated with the matrix, FIGURE 9 is a pulse diagram illustrating the output signals from the gate drivers associated with the output channels of the unit and group matrices of FIGURES 3, 5 and 6, FIGURE 10 is a schematic diagram illustrating the manner in which the flip-flops of FIGURE 3 are connected in cascade, FIGURE 11 is a schematic diagram illustrating a gate driver used in one embodiment of the invention, FIGURE 12 is a schematic diagram illustrating an AND gate used in one embodiment of the invention, FIGURE 13 is a schematic diagram illustrating an OR gate used in one embodiment of the invention, and FIGURE 14 is a schematic diagram of a driver circuit used in one embodiment of the invention.

The drawing (FIGURE 3) illustrates a production control apparatus for monitoring the operation of a large group of machines. A signal means A is coupled to each machine and is operable responsive to a given operating condition of each machine. The signal means A generates a first signal indicative of a given operating condition of the machine. A plurality of gates B corresponding to the machines being monitored, receive the first signals from the signal means. A pulse forming device C having an input channel and a plurality of output channels is utilized to activate the gates B. A timing pulse generator supplies a second electrical signal to the input channel of the pulse forming device. The pulse forming device C sequentially produces pulses on the plurality of output channels responsive to the second signal. The output channels of the pulse forming device are coupled to the gates B for sequentially placing the gates in an activated state whereupon each of the gates having a signal supplied thereto from a signal means A produces an output pulse indicative of the given operating condition of a machine. A graphic recorder D is provided for recording the output signals from the gates B. A means E synchronizes the rotation of the recorder with the signal being supplied to said signal input channel of said pulse forming device C and to the sequence that the gates B are placed in an operable state. The graphic recorder D is actuated responsive to output pulses from the gates B for graphically recording such operating condition of said machines. Thus, recording total duration of such operating condition with respect to each individual identifiable machine and with respect to the time of occurrence thereof.

FIGURE 1 of the drawings illustrates one type machine that a production control apparatus constructed in accordance with the present invention is designed to monitor. The machine illustrated in FIGURE 1 is a conventional loom wired to produce a signal when stoppage occurs. In a textile mill where there are many of such looms, it is desirable to produce a record illustrating the number of times and duration that a particular loom is down in a given period of time. It is also desirable to produce a record indicating the duration that a group of machines are down. Such a record enables a supervisor to analyze the production of workers assigned to a particular group of machines. The operation of a particular machine can also be analyzed from the record. If the machine has registered more down time than usual, it is an indication that the machine requires the attention of a fixed and the operator's production record should not suffer due to the fault of the machines.

The production control apparatus constructed in accordance with the present invention automatically and continuously monitors a great number of machines and the particular embodiment illustrated in the drawings is described, for illustrative purposes only, as monitoring 208 such machines.

Referring of FIGURE 1, a loom is broadly designated at 10 and includes warp yarn W coming off of the loom beam 11 and being fed over the usual whip roll 12. The warp yarn is then fed through the usual drop wires 13. A signal means A is coupled to the loom and is operable responsive to stoppage of the loom. The signal means includes the secondary 14 of the loom transformer which is electrically connected to a rectifier diode 15 and a capacity 16. The capacitor 16 filters out the A.C. ripples in the rectified voltage produced by the diode 15. A tilt switch 17, carried on the shipper rod 18 is electrically connected to the secondary of the transformer through the diode 15. The transformer illustrated is a standard part of the loom control circuitry whose function it is to provide a control voltage in the proper range from its secondary 14. The switch 17 may be mercury tilt switch which is normally closed when the loom is in operation. When the loom stops, causing the shipper rod 18 to shift position, the mercury switch 17 is tilted, opening the electrical circuit from the transformer secondary 14. Thus, when the loom stops, no voltage is supplied to output lead 19 connected on the opposite side of switch 17 from the transformer. Throughout the specification a "zero" voltage will be referred to as a binary "one" and voltage, either positive or negative, will be referred to as a binary "zero." Therefore, in terms of binary signals when the loom is operating there is binary "zero" on lead 19, which corresponds to a voltage, and when the loom is down there is a binary "one" on lead 19 representing "zero" voltage. In some particular components utilized in the production control apparatus a binary "one" will represent voltage, but the voltage of a binary "one" is much less than the voltage representing a binary "zero."

Each of the leads 19 from the 208 machines being monitored is connected to one input of a respective three input type AND gate B (FIGURE 3). Thus, there are 208 AND gates. As each of the AND gates is placed in an activated state in sequence, so that when a binary "one" signal is received by a particular AND gate from a machine, the outputs from the AND gates are produced in sequence. By synchronizing the rotation of the recorder D with the sequence that the AND gates are activated and connecting the outputs signals from the AND gates B to a stylus associated with the recorder, marks can be recorded on the recorder indicating the time and machine that is down. The outputs of the AND gates may also be grouped and connected to counters so that the total down time of a particular group or groups of machines may be recorded.

FIGURE 3 illustrates a suitable circuit for sequentially activating the AND gates B. It should be noted that the AND gates illustrated are three input type AND gates, and when binary "ones" are placed on two inputs other than the input connected to the lead 19 from the machines, the AND gate is placed in the activated state. When a binary "one" signal produced by the stoppage of a machine exists concurrently with its corresponding AND gate being in the activated state, the particular AND gate will produce a binary "one" on its output terminal.

A pulse forming device C, which produces signals for sequentially energizing the AND gates, includes a pair of diode matrices 20 and 21. In order for the diode matrices 20 and 21 to sequentially activate the 208 AND gates, the matrices should be capable of producing at least 208 combinations of signals on their output channels. One means of providing 208 signals, or combination of signals, to the AND gates is through the use of two matrices, one producing 16 output signals in sequence while the other produces 13 output signals in sequence. It is noted that matrix 20 has 16 output channels, DU1 through DU16, and matrix 21 has 13 output channels, DG1 through DG13. The unit diode matrix 20 is driven by the flip-flops FF1 through FF5 so that sixteen binary "ones" are sequentially produced on the output channels DU1 through DU16 for each binary "one" signal produced on the output channels of the group matrix 21. The group diode matrix 21 is driven by flip-flops FF6 through FF9 which are also connected in cascade. Flip-flop FF6, which is coupled to the group matrix, is connected to an output terminal I of flip-flop FF5. By connecting the driving flip-flops FF1 through FF9 in cascade the duration of a binary "one" signal on one of the group matrices output channels DG1 through DG13 is such that all sixteen of the output channels DU1 through DU16 are sequentially energized with a binary "one" before the next output channel of the group matrix 21 is energized with a binary "one" signal. Thus, it can be seen that by combining the sequential outputs on the sixteen channels DU1 through DU16 of the unit matrix 20 with the thirteen sequential outputs on the channels DG1 through DG13 of the group matrix, and connecting same to the AND gates, the 208 AND gates can be sequentially activated.

The output channel DU1 is connected to one input of every sixteenth AND gate. Thus, it is connected to AND gates 1, 17, 33, 49, etc. The output channel DU2 is connected to one input of AND gates 2, 18, 34, 50, etc. The other output channels DU3 through DU6 are connected to the AND gates in a likewise sequential manner. The output channel GG1 of the group matrix is connected to the first sixteen AND gates. The output channel DG2 is connected to the second sixteen AND gates. Output channels DG3 through DG13 are connected to corresponding groups of sixteen AND gates. Therefore, every AND gate is connected to one output channel from the unit matrix 20, one output channel from a group matrix 21, and an output lead 19 from a machine.

Each of the output channels from the unit and group matrices has a gate driver connected thereto for amplifying and inverting signals on the output channels before the signals are connected to the AND gates.

The driving circuitry for the matrices 20 and 21 include a timing pulse generator E which supplies 416 pulses over lead 22 to the first flip-flop FF1 of the nine flip-flops each time the recorder makes one revolution. The pulse generator also supplies a reset pulse over lead 23 to each of the flip-flops everytime the recorder makes one revolution on shaft 24. The reset pulse synchronizes the driving of the matrices with the rotation of the recorder D by placing all of the flip-flops in a binary "zero" state each time shaft 24 passes a given reference point.

It is noted that when a flip-flop is in the binary "one" state there is a binary "one" on its left-hand output terminal and a binary "zero" on its right-hand output terminal. When a flip-flop is in the binary "zero" state the signals on the output terminals are reversed.

FIGURE 7 is a pulse diagram illustrating the output pulses from the timing pulse generator (clock) the left-hand output terminal of flip-flops FF1 through FF5, and unit matrix 20 (DU1 through DU16). Referring to the output pulses from FF1, it can be seen that it takes two input pulses to shift a flip-flop from the binary "one" state, where there is a binary "one" signal on output terminal A, to the binary "zero" state, where there is a binary "zero" on output terminal A and back to the binary "one" state. Thus, for every thirty-two clock pulses being supplied to FF1, such will produce sixteen binary "one" output pulses on the left-hand output terminal A. Since the output pulses from FF1 are used to drive FF2, flip-flop FF2 will produce eight binary "one" outputs on output terminal C in the thirty-two clock pulse period. Following the same reasoning FF3 will produce four binary "one" outputs, FF4 will produce two binary "one" outputs, and FF5 will produce one binary "one" output pulse on its left-hand output terminal in a thirty-two clock pulse period. The output pulses from FF1 through FF5 cause the unit matrix to produce sixteen sequential pulses on its output channels DU1 through DU16 in a thirty-two clock pulse period as illustrated in FIGURE 7. The operation of the matrix is described more fully below.

FIGURE 8 is a pulse diagram illustrating the output pulses on the left-hand output terminals from the flip-flops FF5 through FF9, and group matrix 20 (DG1 through DG13). The pulse diagram illustrated in FIGURE 8 is drawn to a different scale from that of FIGURE 7. As illustrated in FIGURE 8, as well as FIGURE 7, flip-flop FF5 produces one binary "one" output signal on output terminal J for every thirty-two clock pulses received by flip-flop FF1. Flip-flop FF6 produces a binary "one" output for every sixty-four clock pulses or for every two output binary "ones" from FF5. Since all of the flip-flops are connected in cascade, the succeeding flip-flop will change state one-half as many times as the flip-flop that it follows in the chain. As a result a binary "one" will be produced on the output channels of the group matrix in sequence, only once during a revolution of the recorder, whereas, a binary "one" will be produced on each of the output channels of the unit matrix sixteen times during a revolution of the recorder. However, the duration of the pulses from the group matrix is longer than the duration of the pulses produced by the unit matrix.

FIGURE 9 of the drawings illustrate the output pulses from the matrices after they have been inverted by the gate drivers. Only the output signals from the gate drivers associated with the first four output channels of the group matrix are illustrated.

Referring back to FIGURE 3, the outputs of the AND gates are grouped by means of a plurality of OR gates 25. The number of machines in a particular group depends on the type machines being monitored, as well as the individual capability of each operator assigned to the group. A signal on any of the leads 26 connected between an AND gate and an OR gate causes the OR gate to produce an output signal. The output of each OR gate is connected to a counter 27 via a relay driver 28. When the relay driver receives a binary "one" from its associated OR gate, it connects a first low voltage source to the counter 27 to register the signal. Simultaneously, it connects, by lead 29, a high voltage source to a stylus of the recorder D which records a mark indicative of the operational state of a given machine. Since the output signals from the AND gates, OR gates, and relay drivers are produced in sequenece, the signals can be fed over a single lead 29 and recorded by a single stylus on the recorder D. From the data recorded on the recorder D, the individual operational condition of each machine can be determined at any given time. The counters 27 record the total time that the machines in a preselected group are down in a given period of time.

FIGURE 3 of the drawings only shows the output of a particular AND gate being supplied to one OR gate. However, normally it is desired to place a particular machine in more than one type group. For example, it may be desirable that a particular machine be placed in a group representing a style of cloth being run or a group representing the machines assigned to an individual fixer or weaver. This is accomplished by feeding the output of an AND gate to more than one OR gate.

A more detailed description of the components of the circuitry illustrated in FIGURE 3 is as follows:

TIMING PULSE GENERATOR

The timing pulse generator E includes a relaxation oscillator as illustrated in FIGURE 2. Prior to receiving a signal on lead 25 from a synchronization circuit, the oscillator is producing 416 clock pulses on the output lead 22 which is connected to flip-flop FF1. The oscillator is oscillating due to current flow from a positive potential 26 through a variable resistor RT causing capacitor CT to charge. When the capacitor is charged to the firing potential of a transistor T1, the capacitor discharges through lead 27 to the emitter of the UJT transistor T1 causing same to conduct. Current then flows from the posiitve potential 26 through resistor 28, base 28a of transistor T1 and out base 28b through resistor 29 to ground. This conduction causes a positive potential in the form of a pulse to be placed at terminal 30. The potential at terminal 30 is connected by base resistor 31 to the base electrode of a transistor T2 causing transistor T2 to begin conducting. When transistor T2 begins to conduct current flows from the positive potential 26 through collector load resistor 32 in the collector of transistor T2 and out the emitter to ground. The conduction of transistor T2 causes terminal 32a to go from a positive potential, which represents a binary "zero," to a relatively low voltage which represents a binary "one." The oscillation of the relaxation oscillator produces 416 binary "one" pulses on lead 22 every minute or for every revolution of shaft 24. The frequency of the oscillation is controlled by the variable resistor RT and capacitor CT.

Synchronization circuit

The synchronization circuit (FIGURE 2) for the oscillator and the recorder includes a pulse producing device generally designated at 33 which generates a pair of pulses each time the shaft 24, from which the recorder is driven, makes a revolution. One of the pulses, which is referred to as a reset pulse, is fed to all of the flip-flops FF1 through FF9 to place them in a "zero" binary state. The other pulse is supplied to the input lead 25 of the oscillator causing transistor T1 to conduct. Such causes the output pulses from the timing pulse generator E to be synchronized with a preselected point on the recorder. The reset pulse is produced slightly ahead of the synchronization pulse to insure that the flip-flops and martices are in a "zero" binary state prior to synchronization of the oscillator. The pulses are created by a pair of cams 34 and 35 closing a pair of switches 36 and 37, respectively, that are connected in series with a positive voltage from power supply 38. The cams are eccentrically carried on the same shaft 24 from which the recorder is rotated and each time the shaft 24 passes a given reference point, the cams close switches 36 and 37 generating a synchronization pulse and a reset pulse.

Recorder

One suitable recorder which can be utilized with the production control apparatus is illustrated in FIGURE 4. The recorder includes a drum 39 which is rotatably carried on shaft 24. The shaft 24 and the drum 39 are rotated by a motor 40 at a rate of one revolution per minute. A piece of recording paper 41 is stretched tightly around the drum 39 to record the signals produced by the AND gates B and fed to a stylus 42 of the recorder. The paper is lined circumferentially into 208 segments, each segment representing a machine as indicated in FIGURE 4A. As the drum rotates, the stylus 42 is slowly driven longitudinally across the drum by a lead screw 43. The paper 41 is sensitive to electric current so that when the recording stylus 42, which is connected to the outputs of the AND gates, is energized, a trace Z (see FIGURE 4A) is burned on the paper. The burning stylus 42 is mounted on a carriage 44 which has a guide 45 and is driven longitudinally across the drum by the lead screw 43. The lead screw 43 is in turn driven from shaft 24 by means of a sprocket 46, securely attached thereto, by a setscrew 47, providing power through a sprocket chain 48 to a sprocket 49. The sprocket 49 is attached to shaft 43 by means of a friction clutch 50, against which rests a compressed spring 51 held in place by stop 52. The pressure exerted by the clutch 50 is so adjusted that the drive from shaft 24 will remain positive under normal operating conditions. However, it is possible to turn the knurled nut 53 by hand and override the drive from shaft 24 in either direction, thus enabling preliminary adjustments at start-up or at the operators discretion. The lead screw 43 is supported by bearing 54 at both ends.

Should the stylus become energized at any particular moment, it will mark a trace Z at a specific point on the paper. This point is always in agreement with the AND gate being activated, to identify the source, and with the progression of the stylus along the longitudinal surface of the drum to determine the time of the occurrence since the sequence that the AND gates are scanned, the stylus drive, and the rotation of the drum are synchronized. The paper is prelined and prepositioned (see FIGURE 4A) on the drum so that any marking Z on the paper will be readily identified as to the source as at X and time of receipt of such intelligence as at Y. Duration of the occurrence resulting in the markings or traces Z may be visually observed by observing elapsed time for successive markings.

The recorder drum is rotatably supported by a pair of end bells 55 which are securely fastened to a rugged baseplate 56 by means of bolts 57. It is noted that the end bells 55 support the shaft 24 for rotation axially of the assembly. The motor 40 is supported by a specially prepared bracket 58 that is clamped to the end bell 55. The holes 59 receive the necessary screws (not shown) to tighten the bracket 58. A gear 61 is attached to shaft 60 of motor 40 and is meshed with gear 62. In turn, gear 62 is fastened to the shaft 24 by pin 63. The net result is that the motor 40 drives shaft 24. The leads (not shown) of the motor 40 are dressed out through a suitable port in the wall of end bell 55. Since the shaft 24 must extend through the end bells 55, the bearings 64 and 65 are provided. A wheel 66 is attached by means of a key 67 to shaft 24. The wheel 66 is attached to the drum 39 as by screws 69. The other end of the drum is supported by a wheel 70 which turns on a bearing 71 supported by the adjacent end plate 55.

The motor drives the shaft 24 which in turn drives both the cams 34 and 35 and the drum 39 in synchronization. The cam 34 closes switch 36 causing a reset pulse to be supplied to all of the flip-flops over lead 23 from the power supply 38. Cam 35 closes switch 37 slightly behind the closing of switch 36 (less than one pulse width) so that all of the flip-flops can be reset prior to a synchronization signal being supplied to the oscillator.

Flip-flop driving circuit

The driving circuitry for the diode matrices 20 and 21 consists of nine flip-flops connected in cascade (FIGURES 3 and 10). The output signals produced by a particular flip-flop is used to provide a particular column of one of the diode matrices 20 or 21 with a binary "one" or "zero" as well as supplying the succeeding flip-flop with a state changing signal. Since the flip-flops are connected in cascade, each succeeding flip-flop produces one-half as many output pulses as the preceding flip-flop. However, the duration of the output pulses produced by each succeeding flip-flop is twice that of the preceding flip-flop.

Each of the flip-flops has a pair of output leads. The output leads for flip-flop FF1 are A and B, while the output leads for flip-flop FF5 are I and J. By connecting each output lead of a flip-flop to a corresponding column of a diode matrix, the matrices may be driven so as to produce sequential binary "one" signals on their output rows.

The flip-flops illustrated in FIGURE 10 are bistable circuits. The resistive and bias values of the circuits are chosen so that the initial application of a clock pulse to lead 22 connected to flip-flop FF1 is steered to the base of transistor T3 by coupling capacitor C1 and diode D1 causing transistor T3 to be driven into saturation and transistor T4 to be cut off. When transistor T3 is conducting and transistor T4 is off, there is a binary "one" at terminal A and a binary "zero" at terminal B which is referred to as the "one" state for the flip-flop. The binary "one" pulse on terminal A is coupled by lead 77 to the input of flip-flop FF2 causing transistor T3 of flip-flop FF2 to begin conducting when transistor T3 of flip-flop FF1 is cutoff. It is noted from the pulse diagrams that the trailing edge of the clock pulses and output pulses cause the transistors to turn on.

The flip-flop FF1 remains in binary "one" state until the next clock pulse is applied to lead 22. The second clock pulse is steered to the base of transistor T4 by capacitor C2 and steering diode D7 and the trailing edge of the second pulse causes transistor T4 to begin conducting. As transistor T4 begins conducting, transistor T3 tends to become non-conducting due to the increasing voltage being supplied from the collector of transistor T4 to the base of transistor T3. When transistor T4 is conducting, the flip-flop is in a "zero" state at which time there is a binary "zero" on the output terminal A and a binary "one" on the output terminal B. It is noted that the collector voltage of transistor T4 is coupled to its base electrode through diodes D2 and D3. The collector of transistor T3 is coupled to its base electrode through similar diodes D5 and D6.

As the clock pulses are supplied to the flip-flop FF1, such flip-flop alternates from a binary "one" state to the binary "zero" state. Each time a binary "one" pulse is produced on terminal A such is coupled to flip-flop FF2 by leads 77 and 77a causing it to change state. Prior to receiving the first clock pulse in a cycle, the reset pulse produced by the timing pulse generator is fed over lead 23 through diode 23a to each of the flip-flops to set all of the flip-flops in a "zero" binary state.

When the transistors T3 are in a non-conducting state, there are negative voltages on the left-hand output terminals A, C, E, G, and I. The negative voltages or binary "zero" on the last mentioned output terminals are due the negative voltage source 72 being coupled thereto through collector load resistors 73 and lead 74. As previously mentioned, when the first clock pulse is supplied to lead 22 from the timing pulse generator E, the trailing edge thereof initiates the conduction of transistor T3 causing the collector voltage at junction 75 to become more positive. The collector voltage at junction 75 is coupled to the base of transistor T4 through coupling resistor 76 and diode D2 causing transistor T4 to begin cutting off. As transistor T4 begins cutting off, its collector voltage tends to go negative with respect to its base voltage. The regenerative effect causes transistor T4 to cut off completely while transistor T3 is driven into saturation.

Thus, it can be seen, the flip-flop FF1 changes states twice as many times as FF2.

The collector of transistor T4 is connected to the negative voltage source 72 through lead 72a and collector resistor 78. The collector of transistor T4 is also coupled to the base of transistor T3 through resistor 79 and diode D6. Each of the transistors has a positive bias 80 connected to the base electrode through a base resistor 81. It is also noted that the emitter electrode of each electrode is connected to a common lead 81a or ground. A steering resistor 82 is connected between the collector of each transistor and the base electrode to steer the incoming clock pulses to the transistor that is non-conducting.

Other flip-flops with minor modification may be utilized for driving the diode matrices as long as they produce output signals similar to those illustrated in FIGURES 7 and 8.

Matrices

A pair of suitable matrices for driving the AND gates are illustrated in FIGURES 5 and 6. The unit diode matrix 20 is illustrated in FIGURE 5 while the group diode matrix 21 is illustrated in FIGURE 6.

The flip-flops FF1 through FF5 drive the unit diode matrix 20. Each of the output conductors of the flip-flops is connected to a respective column of the matrix. The row conductors DU1 through DU16 are the output conductors of the matrix 20 upon which binary "one" signals are sequentially placed thereon. In the particular embodiment illustrated each row has five diodes connected thereto. Each of the diodes has its cathode connected to one output terminal of a respective flip-flop. For example, the output row DU1 has a first diode D9 connected to output terminal A of flip-flop FF1, a second diode D9 connected to output terminal D of flip-flop FF2, a third diode connected to output terminal F of flip-flop FF3, a fourth diode connected to output terminal H of flip-flop FF4, and a fifth diode connected to output terminal J of flip-flop FF5. The other rows also have five diodes each coupled to a respective output terminal of a flip-flop.

In order to produce a binary "one" signal on a particular row conductor, each of the diodes associated with that row must have its cathode connected to an output terminal of a flip-flop that has a binary "one" thereon. For example, after the first clock pulse is received by flip-flop FF1, output terminals A, D, F, H and J of the flip-flops have binary "ones" thereon. Thus, there will be a binary "one" produced on row conductor DU1. After the third clock pulse the output terminals A, C, F, H and J will have binary "ones" thereon. Thus, there will be a binary "one" produced on row conductor DU2. Row conductor DU1 will not have a binary "one" thereon since output terminal D has a binary "zero" thereon. By energizing the flip-flops in the manner illustrated in FIGURE 7, binary "one" signals are produced in sequence on the rows, as illustrated in FIGURES 7 and 8.

The group matrix 21 operates in the same manner as the unit matrix 20. In analyzing the pulse diagrams of FIGURES 7 and 8, it is noted that the state of the flip-flop is illustrated rather than the output signals on the two output conductors of the respective flip-flop. When a flip-flop is in the binary "one" state, the left-hand output conductor has a binary "one" thereon and the right-hand output conductor has a binary "zero" thereon.

Each of the output row conductors has a negative voltage 83 connected to the right-hand end thereof through a resistor 84 by means of conductor 84a. A diode 85 is positioned in each row conductor between the junction where conductor 84a connects to the row conductor and the junction where diode D9 connects output terminal J of flip-flop FF5 to the row conductor. The cathode of diode 85 faces the right-hand end of the row. A positive voltage 86, of less magnitude than the voltage of a binary "one" signal from the flip-flop or the negative voltage 83 is connected to the left-hand end of each row conductor through a resistor 87. Other suitable matrices, such as magnetic core matrices may be utilized in an apparatus constructed in accordance with the present invention.

Gate driver

A suitable gate driver for inverting a signal from one of the output channels of the matrices and supplying the inverted signal to one input of an AND gate is illustrated in FIGURE 11. The gate driver includes a transistor T5 having its base 88 connected to one of the output channels of a matrix through a current limiting resistor 88a. The collector 89 of the transistor T5 is connected to a positive potential 90 through a collector load resistor 91. A base bias voltage resistor 92 is coupled between the positive potential 90 and the base of the transistor. The emitter 93 of the transistor 95 is connected directly to ground. An output terminal U1 is connected to the collector 89 for supplying an output binary signal to an input of one of the AND gates. When a binary "zero" or negative voltage is on a particular output channel of the matrix that the gate driver is coupled to through the base electrode, transistor T5 will be non-conducting. Thus, there is a potential on the output terminal substantially equal to the positive potential 90 which represents a binary "zero." However, when there is a binary "one" on the base electrode 88, which is substantially "zero" voltage, the transistor will conduct causing current to flow from the positive potential 90 through the collector electrode 89 and out the emitter electrode 93 to ground. The potential on the output terminal U1 is substantially "zero" volts, which represents a binary "one." Each of the gate drivers operate in a similar manner and FIGURE 9 illustrates the outputs from the gate drivers. The output signals from the gate drivers associated with a matrix are sequentially coupled to the AND gates.

Any AND gate that has two binary "ones" thereon supplied by two gate drivers is considered to be in the activated state.

AND gate

FIGURE 12 illustrates a suitable AND gate that may be used in the circuitry shown in FIGURE 3. The AND gate illustrated in FIGURE 12 represents the AND gate number 1, which has a first input terminal 94 connected to output channel DU1 of unit matrix 20 via the output lead U1 of a gate driver. A second input terminal 95 is connected to out channel DG1 of the group matrix 21 via the output lead G1 of a respective gate driver. The third input terminal 96 is connected directly to a respective machine via lead 19. When there is a binary "one" on all three input terminals a binary "one" will appear on output terminal 97. The AND gate consists of three input diodes 98, 99 and 100, having their anodes connected to a respective input terminal, while their cathodes are coupled together by a common conductor 101. A negative potential or bias 102 is coupled to conductor 101 through a coupling resistor 103. A positive potential or bias 104 is connected to conductor 101 through a coupling resistor 105 and an isolating diode 106 by one end of lead 107. The other end of lead 107 is connected to one of the inputs of a respective OR gate. The cathode of the isolating diode 106 is connected to the conductor 101. In the particular AND gate illustrated the negative potential 102 has a magnitude of less than the positive potential 104 and the positive potential 104 is substantially equal to the voltage representing a binary "zero" applied to one of the input terminals 94, 95 or 96. When there are less than three binary "ones" on the input terminals there is a potential on the output terminal 97, which is approximately equal to the positive potential 104, which corresponds to a binary "zero." Such is due to the nonconduction of the isolating diode 106 and the conduction of at least one of the input diodes. When there are three binary "ones" on the inputs 94, 95 and 96 there is a potential on the output terminal 97 of less magnitude than the positive potential 104 which represents a binary "one." This is due to the conduction of isolating diode 106 and the non-conduction of the input diodes. Thus, in order for an AND gate to produce a binary "one" output, there must be three binary "ones" on the input terminals. The output signal of a respective AND gate represents the operational condition of a particular machine. Therefore, the outputs of the AND gates may be grouped according to the grouping of particular machines, in a mill and the operation of the machines may be analyzed in groups or individually. One means of grouping the output signals from the AND gates is by OR gates. It is within the scope of the present invention to reverse the diodes and the bias voltages so that the AND gate would operate responsive to input binary "zero" signals of the opposite polarity.

OR gates

The diode logic circuit in FIGURE 13 performs the OR function in which a binary "one" signal on any of the input terminals 108 through 113 causes a binary "one" signal to be produced on the output terminal 114. The OR gates consist of a plurality of diodes 115 each having its cathode connected to a respective input terminal. The anodes of the diodes 115 are coupled together by lead 116. A positive potential 117 is connected to a lead 118, which connects the output terminal 114 to lead 116, via a coupling resistor 119. A diode 120 is positioned adjacent the output terminal 14 with its cathode facing the output terminal. If there are no binary "one" signals on any of the input terminals 108 through 113, there will be a voltage at the output terminal 14 approximately equal to the positive potential 117. However, if there is a binary "one" signal, which represents a low voltage, on any of the input terminals 108 through 113 there will be a low voltage, relative to the positive potential 117, on the output terminal 114. This low voltage represents a binary "one" signal.

Since the AND gates are being activated in sequence and only one AND is activated at a time, at the maximum there will be a single binary "one" signal on the input terminals of the OR gates at a time. A detailed explanation of the operation of OR gates and AND gates is illustrated in the book entitled ABC's of Computers, by Allan Lytel, and published by Howard W. Sams & Co., Inc.

While OR gates have been utilized in the embodiment illustrated to group the output signals from the AND gates, it is within the scope of the present invention to use other suitable devices, such as patch boards.

Driver circuit

The output terminal 114 of each OR gate is connected to an input terminal 121 of a relay driver. When a binary "one" signal is supplied to the relay driver by its respective OR gate, the relay driver causes a high voltage source 122 to be connected to the stylus of the recorder D to record the signal. The relay driver also causes a low voltage source 123 to be coupled to a counter 27 associated with a particular group of AND gates to record the binary "one" signal which represents the operational condition of a particular machine.

The relay driver includes a pair of transistors T6 and T7. Transistor T6 is normally conducting due to the high voltage (binary "zero") being supplied to its base electrode 124 through resistor 124a. A collector electrode 125 of transistor T6 is connected to a positive potential 126 through a collector load resistor 127. An emitter electrode 128 of transistor T6 is connected directly to ground. A bias load resistor 129 is connected between the collector electrode 125 and the base electrode 124. If a binary "one" signal is placed on the biased electrode 124 of transistor T6, it will cause transistor T6 to cut off. When transistor T6 cuts off, its collector voltage rises. Since the collector 125 is connected to an emitter electrode 130 of transistor T7, the rise in collector voltage will cause transistor T7 to cut on. When transistor T7 cuts on current flows from the positive potential 126 through base 131 of transistor T7 and out base 132 through a winding of a relay 133 energizing the relay. The energization of relay 133 causes the relay to close contacts 134 and 135. When contacts 134 is closed the high voltage source 122 is connected to the stylus of the recorder causing a mark to be recorded on the recording paper. The location of the mark on the paper is indicative of the operational condition of a particular machine and the time of occurrence of the condition. A diode 136 is placed between the high voltage source and the recorder to prevent cross-over voltages from other relay drivers.

When relay contact 135 is closed, the low voltage source 123 is connected to a counter 27 to register the operational conditions of a group of machines. The counter indicates the total time that the machines of a particular group are down.

After the binary "one" signal leaves input terminal 121 transistor T6 will begin conducting again. Thus, transistor T7 will return to the non-conducting state and relay 133 will be de-energized causing contacts 134 and 135 to open. Therefore, it can be seen that the signals being supplied to the counter 27 and the recorder are in the form of pulses.

It is within the scope of the present invention to utilize other type pulse forming devices as long as they produce pulses in a sequential manner for activating the AND gates. One suitable pulse forming device would be a shift register which produces signals on parallel output channels in sequence.

Another type pulse forming device that could be utilized incorporates a pair of rotating mechanical switches. One of said switches would perform the function of the unit matrix while the other performed the function of the group matrix. The contacts of each switch would be connected to a respective AND gate. The switches would be wired together to produce output signals similar to those produced by matrices 20 and 21 as illustrated in FIGURES 7 and 8.

While a preferred embodiment of the invention has been described using specific terms, such description is for illustrative purposes only, and it is to be understood that changes and variations may be made without departing from the spirit or scope of the following claims.

What is claimed is:

1. In a production control apparatus for monitoring the operation of a large group of machines including, signal means coupled to each machine operable responsive to a given operating condition of each machine for generating a first signal indicative of a given operating condition of said machine; a plurality of gates corresponding to the machines being monitored; means for supplying said first signals from said signal means, each indicative of a given operating condition of a particular machine, to a corresponding gate; a pulse forming device, an input channel connected to said pulse forming device, a plurality of output channels connected to said pulse forming device; a timing means for supplying a second electrical signal to said input channel of said pulse forming device, said pulse forming device sequentially producing pulses on said plurality of output channels responsive to said second signal; said output channels of said pulse forming device being coupled to said gates for sequentially placing said gates in an activated state whereupon each of said gates having said first signal supplied thereto from said signal means produces an output pulse indicative of said given operating condition of a machine; a recorder; means for synchronizing the recording of information on said recorder with the signal being supplied to said input channel of said pulse forming device and to the sequence that said gates are placed in an activated state; and means for actuating said recorder responsive to output pulses from said gates for recording such operating condition of said machines thus recording total duration of such operating condition with respect to each individual identifiable machine and with respect to the time of occurrence thereof.

2. The device as set forth in claim 1, wherein said pulse forming device includes: a pair of matrices; one of said matrices producing signals in sequence on its output channels responsive to said second electric signal representing units; and the other matrix producing signals in sequence on its output channels responsive to said second electric signal representing groups; whereby different combinations of signals from the output channels of the first and second matrices are connected to the gates for sequentially placing said gates in an activated state.

3. The device as set forth in claim 1, further including, a rotatably mounted shaft, power operated means driving said shaft uniformly, and whereby said recorder includes a first graphic recorder means, a positive drive for moving said first graphic recorder means from said shaft, a second graphic recorder means driven progressively across said first graphic recorder means in predetermined timed sequence and means for actuating one of said graphic recorder means responsive to output pulses from said gates for graphically recording the operating condition of the machines.

4. The device as set forth in claim 3, wherein the means for synchronizing the recording of information on said recorder with the sequence that the gates are placed in an operable state includes, a power supply, a switch carried on said shaft for connecting said power supply to said means for supplying a second electrical signal responsive to said shaft and said first graphic recorder means passing a given reference point, whereby a signal from said power supply resets said means for supplying a second electrical signal to an operating state which corresponds to the given reference point on said recorder.

5. The device as set forth in claim 1 further comprising: a plurality of totalizing means, means for selectively connecting the output pulses from said gates to a selected totalizing means whereby the total time of such operating condition of selected machine groupings may be recorded.

6. The device as set forth in claim 5, wherein said means for selectively connecting output pulses from said gates to a selected totalizing means includes a plurality of OR gates and wherein said gates are AND gates.

7. In a production control apparatus for monitoring the operation of a large group of machines including, signal means coupled to each machine operable responsive to a given operating condition of each machine for generating a first signal indicative of a given operating condition of said machine; a plurality of gates corresponding to the machines being monitored; means for supplying signals from said signal means each indicative of a given operating condition of a particular machine to a corresponding gate; a rotatably mounted shaft; power operated means driving said shaft uniformly; a first graphic recorder means, a positive drive for driving said first graphic recorder means from said shaft; a second graphic recorder means driven progressively across said first graphic recorder means in a predetermined timed sequence; a timing pulse generator generating a plurality of pulses; a switch means coupled to said shaft for synchronizing the output of pulses from said timing pulse generator with the rotation of said first graphic recorder and said shaft; a pair of matrices, each of said matrices having a plurality of output channels, a plurality of flip-flops connected in cascade, means for supplying the output pulses from said timing pulse generator to a first flip-flop in cascade, one group of said flip-flops in driving relation with one of said matrices causing same to produce sequential signals on the output channels associated therewith, another group of said flip-flops in driving relation with the other matrix causing said other matrix to produce sequential signals on the output channels associated therewith; said output channels of said pulse forming device being coupled to said gates for sequentially placing said gates in an activated state whereupon each of said gates having said first signal supplied thereto from said signal means produces an output pulse indicative of said given operating condition of a machine; means for actuating one of said graphic recorder means responsive to output pulses from said gates for graphically recording such operating condition of said machines thus recording total duration of such operating condition with respect to each individual identifiable machine and with respect to the time of occurrence thereof; a plurality of totalizing means, means for selectively connecting the output pulses from said gates to a selected totalizing means whereby the total time of such operating condition of selected machine groupings may be recorded.

8. In a production control apparatus for monitoring the operation of a large group of machines including, signal means coupled to each machine operable responsive to a given operating condition of each machine for generating a first signal indicative of a given operating condition of said machine; a plurality of gates corresponding to the machines being monitored, each of said gates having a plurality of input terminals and an output terminal, said gates being arranged in groups; means for supplying said first signals from said signal means, each indicative of a given operating condition of a particular machine, to a first input terminal of a corresponding gate; a unit pulse forming device; a plurality of output channels connected to said unit pulse forming device; a timing means for supplying a timing signal to said unit pulse forming device, said unit pulse forming device sequentially producing second signals on said plurality of output channels responsive to said timing signal, each of said output channels of said unit pulse forming device being coupled to a second input terminal of a respective gate in each group for supplying said second signals to said respective gates; a group pulse forming device, a plurality of output channels connected to said group pulse forming device; means for supplying a control signal to said group pulse forming device responsive to the operation of said unit pulse forming device, said group pulse forming device sequentially producing third signals on said plurality of output channels responsive to receiving said control signal responsive to the operation of said unit pulse forming device; each of said output channels of said group pulse forming device being coupled to a third input terminal of said gates of a respective group of gates for supplying said third signals to said respective groups of gates; said second and third signals from said unit pulse forming device and said group pulse forming device respectively sequentially placing said gates in an activated state whereupon each of said gates having first signal supplied thereto from signal means produces an output pulse on its output terminal indicative of said given operating condition of a machine.

References Cited

UNITED STATES PATENTS

| | | | |
|---|---|---|---|
| 2,207,715 | 7/1940 | Bumstead | 346—33 |
| 3,091,756 | 5/1963 | Lowman | 346—34 |

RICHARD B. WILKINSON, *Primary Examiner.*

M. LORCH, *Assistant Examiner.*